(12) United States Patent
Finck

(10) Patent No.: US 9,701,486 B2
(45) Date of Patent: Jul. 11, 2017

(54) GLAZING PANEL HANDLING SYSTEM

(75) Inventor: William Finck, Brentwood (GB)

(73) Assignee: Belron Hungary Kft—Zug Branch, Zug (CH)

( * ) Notice: Subject to any disclaimer, the term of this patent is extended or adjusted under 35 U.S.C. 154(b) by 0 days.

(21) Appl. No.: 13/148,408

(22) PCT Filed: Feb. 22, 2010

(86) PCT No.: PCT/GB2010/000300
§ 371 (c)(1),
(2), (4) Date: Aug. 8, 2011

(87) PCT Pub. No.: WO2010/094931
PCT Pub. Date: Aug. 26, 2010

(65) Prior Publication Data
US 2011/0309042 A1    Dec. 22, 2011

(30) Foreign Application Priority Data
Feb. 20, 2009 (GB) .................. 0902953.9

(51) Int. Cl.
*B65G 49/06* (2006.01)

(52) U.S. Cl.
CPC ......... *B65G 49/062* (2013.01); *B65G 49/061* (2013.01); *B65G 2249/04* (2013.01)

(58) Field of Classification Search
CPC ....... A47B 3/091; A47B 43/00; A47B 3/0803; A47B 3/0917; A47B 2003/0806; A47B 2003/008; A47B 3/08; B65G 49/061; B65G 49/062; B65G 2249/04; B65D 85/48; B60P 3/002; D06F 57/08; B62B 3/108; B62B 1/268; A47F 5/10; B25H 1/04

USPC ........ 211/41.14, 41.15, 41.16, 27, 60.1, 189, 211/182, 175, 207, 208, 204, 206, 195, 211/201, 199, 149; 269/71, 75, 45, 901; 248/188.2, 188.5, 188.8, 161, 157, 188.6, 248/188.1, 163.1; 108/6–8, 162, 179, 108/124; 144/286.1, 286.5, 287
See application file for complete search history.

(56) References Cited

U.S. PATENT DOCUMENTS

| | | | | |
|---|---|---|---|---|
| 2,177,153 | A * | 10/1939 | Ross et al. .................... | 15/246.4 |
| 2,887,348 | A * | 5/1959 | Sadowsky ............ | A47B 3/0803 108/124 |
| 3,040,904 | A * | 6/1962 | St Amour .......................... | 108/1 |
| 3,191,959 | A * | 6/1965 | Heimbruch ............... | B62B 3/02 280/33.991 |
| 3,643,935 | A * | 2/1972 | Bell ................................ | 269/16 |

(Continued)

FOREIGN PATENT DOCUMENTS

| | | |
|---|---|---|
| DE | 20015339 | 12/2000 |
| WO | WO2005/105541 | 11/2005 |

*Primary Examiner* — Daniel J Troy
*Assistant Examiner* — Hiwot Tefera
(74) *Attorney, Agent, or Firm* — Gordon & Jacobson, P.C.

(57) ABSTRACT

A support structure (21) supports a glazing panel in a laid down attitude at a support zone. The structure provides access permitting a technician to move bodily into and/or out of the support zone and/or one or more support elements having a respective locating formation for locating the glazing panel with respect to the support structure such that the glazing panel can be tilted or pivotally moved with respect to the support structure. The structure provides for improved handling of glazing panels.

19 Claims, 5 Drawing Sheets

(56) References Cited

U.S. PATENT DOCUMENTS

| | | | | |
|---|---|---|---|---|
| 3,693,808 A * | 9/1972 | Rauch | A47F 5/13 135/67 |
| 3,746,358 A * | 7/1973 | Swick, Jr. | B62B 3/02 280/651 |
| 3,805,710 A * | 4/1974 | Leshem | A47B 3/0803 108/124 |
| 3,836,144 A * | 9/1974 | Mahoney | 473/435 |
| 3,923,167 A * | 12/1975 | Blankenbeckler | 414/11 |
| 3,958,786 A * | 5/1976 | Mann | 248/176.3 |
| 4,108,154 A * | 8/1978 | Nelson | 126/576 |
| 4,196,675 A * | 4/1980 | Cook | A47B 3/0803 108/124 |
| 4,239,197 A * | 12/1980 | Olstad | 269/68 |
| 4,522,130 A * | 6/1985 | Worthington | 108/159 |
| 4,534,447 A * | 8/1985 | Champigny | 182/152 |
| 4,748,913 A * | 6/1988 | Favaretto et al. | 108/50.02 |
| 4,754,711 A * | 7/1988 | Solomon | 108/8 |
| 4,804,162 A * | 2/1989 | Rice | 248/671 |
| 4,880,194 A * | 11/1989 | Geise et al. | 248/166 |
| 5,197,393 A * | 3/1993 | Yeakle | 108/10 |
| 5,348,377 A * | 9/1994 | Grosch | 297/423.45 |
| 5,415,311 A * | 5/1995 | Coogan | B65D 19/12 206/600 |
| 5,439,152 A * | 8/1995 | Campbell | B60R 9/00 108/55.1 |
| 5,555,954 A * | 9/1996 | Swiderski | 182/152 |
| 5,564,346 A * | 10/1996 | Robben | 108/108 |
| 5,644,994 A * | 7/1997 | Liang | A47B 3/083 108/115 |
| 5,660,637 A * | 8/1997 | Dodge | 118/500 |
| 5,666,888 A * | 9/1997 | Dame et al. | 108/147.21 |
| 6,003,447 A * | 12/1999 | Cox et al. | 108/50.02 |
| 6,314,892 B1 * | 11/2001 | Favini | A47B 3/002 108/115 |
| 6,443,410 B1 * | 9/2002 | Lee | 248/235 |
| 6,443,481 B1 * | 9/2002 | Stravitz et al. | 280/651 |
| 6,561,470 B1 * | 5/2003 | Gottfredson et al. | 248/201 |
| 6,851,564 B2 * | 2/2005 | Ng | 211/149 |
| 7,185,899 B2 * | 3/2007 | Thiede | A47B 46/00 211/189 |
| 7,216,411 B1 | 5/2007 | Mayhugh | |
| 7,249,680 B2 * | 7/2007 | Wang | 211/37 |
| 7,270,236 B2 * | 9/2007 | Angeletti et al. | 206/448 |
| 7,278,959 B2 * | 10/2007 | Brown, III | 482/104 |
| 7,802,526 B2 * | 9/2010 | Brady | B65D 19/12 108/53.5 |
| 8,051,785 B2 * | 11/2011 | Lin | 108/115 |
| 8,066,267 B2 * | 11/2011 | Schaerer | 269/17 |
| 8,210,312 B1 * | 7/2012 | Tetreault, Jr. | 182/119 |
| 8,231,087 B1 * | 7/2012 | Giordano, Jr. | B01F 15/00668 108/115 |
| 8,291,830 B2 * | 10/2012 | Rutz | 108/7 |
| 8,464,879 B2 * | 6/2013 | Black, Jr. | A47F 7/0014 211/181.1 |
| 2004/0011259 A1 * | 1/2004 | Meadows | 108/115 |
| 2004/0222179 A1 * | 11/2004 | Garcia | 211/206 |
| 2005/0274301 A1 * | 12/2005 | Rattin | A47B 3/0803 108/124 |
| 2006/0144805 A1 * | 7/2006 | Wang | 211/37 |
| 2008/0011918 A1 | 1/2008 | Bruce et al. | |
| 2008/0029473 A1 * | 2/2008 | Hu | 211/206 |
| 2008/0150244 A1 * | 6/2008 | Carlei | 280/35 |
| 2008/0217276 A1 * | 9/2008 | Brady | B65D 19/12 211/195 |
| 2008/0217503 A1 * | 9/2008 | Zhuang | 248/558 |
| 2008/0237168 A1 * | 10/2008 | Harpole | 211/195 |
| 2010/0071600 A1 * | 3/2010 | Lin | 108/115 |
| 2011/0017692 A1 * | 1/2011 | Marietta | A47B 43/00 211/195 |
| 2011/0031201 A1 * | 2/2011 | Chen | A47B 43/00 211/201 |

\* cited by examiner

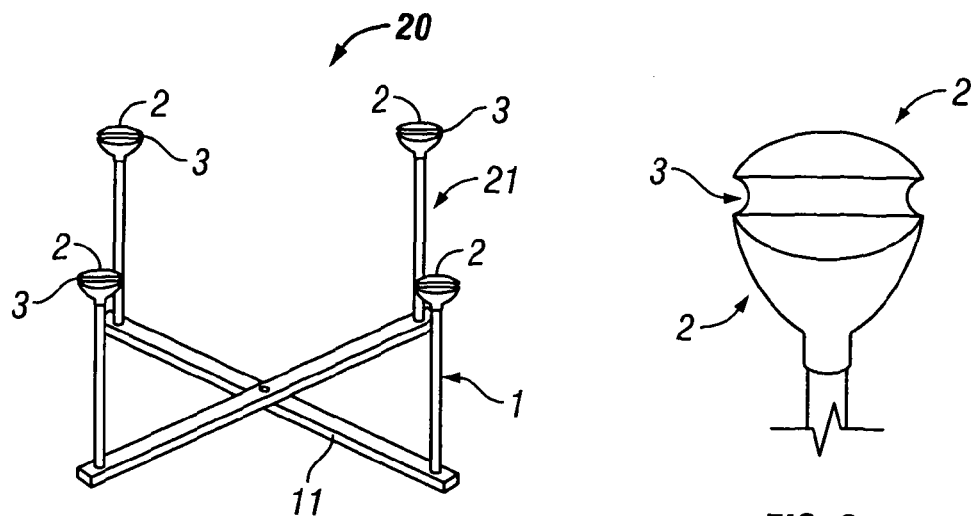
FIG. 1
FIG. 2
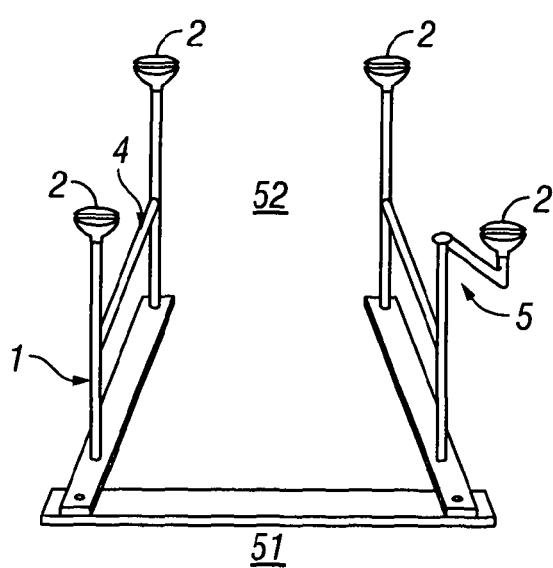
FIG. 3
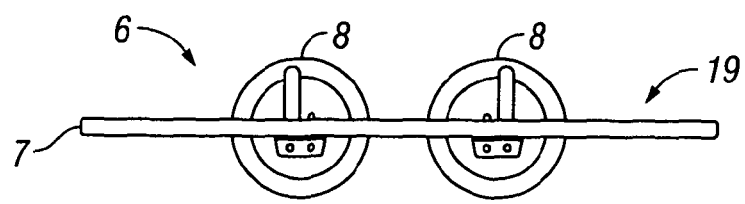
FIG. 4

GLAZING PANEL HANDLING SYSTEM

CROSS-REFERENCE TO RELATED APPLICATIONS

This application claims priority from PCT/GB/2010/000300 filed on Feb. 22, 2010 and from GB 0902953.9, filed Feb. 20, 2009, which are hereby incorporated by reference in their entireties.

BACKGROUND OF THE INVENTION

1. Field of the Invention

The present invention relates to a glazing panel handling system.

2. State of the Art

There are various activities in which individuals are required to lift and handle relatively heavy glazing panels. Frequently such panels are required to be lifted by a lone operative and handing the glazing panels in such circumstances can be difficult and can lead to health and safety problems if good lifting/handling practices are not followed. Particularly, problems may be encountered for example in situations where vehicle windscreens are handled by operatives, as these are often heavy and cumbersome to lift and handle.

The present invention is intended to provide a glazing panel handling system to promote an facilitate the safe handling, turning and lifting of glazing panels, particularly vehicle windscreens, primarily by allowing operations to be carried out with the minimum of effort and promoting safe lifting practices for operatives.

It is particularly, but not exclusively, envisaged that the glazing panel handling system of the present invention will be of use in conjunction with other handling tools and installations which use a positioning and or lifting aid, for example as disclosed in U.S. Pat. No. 7,216,411.

SUMMARY OF THE INVENTION

An improved system and technique has now been devised.

According to the invention, there is provided a glazing panel handling system comprising:
  a support structure arranged to support the glazing panel in a laid down attitude at a support zone; wherein the support structure includes:
    i) access means permitting a technician to move bodily into and/or out of the support zone; and/or,
    ii) one or more support elements having a respective locating formation for locating the glazing panel with respect to the support structure such that the glazing panel can be tilted or pivotally moved with respect to the support structure.

In a preferred embodiment, the system includes both the access means permitting a technician to move bodily into and/or out of the support zone; and also the one or more support elements having a respective locating formation for locating the glazing panel with respect to the support structure such that the glazing panel can be tilted or pivotally moved with respect to the support structure.

It is preferred that the support structure comprises a plurality of upstanding supports, the upstanding supports being configured to support the glazing panel in the laid own attitude at the support zone.

Beneficially three or more upstanding supports are provided to support the glazing panel in the laid own attitude.

Preferably four upstanding supports are provided each positioned at a respective corner of the support zone.

In one or more embodiments, the spacing between the upstanding supports may be adjustable.

In one or more embodiments, one or more of the upstanding supports may be height adjustable.

Beneficially, the upstanding supports are provided at a perimeter of the support zone and the access means permits a technician to move bodily into and/or out of the support zone across the perimeter. Accordingly, the access means may comprise a space or passage gap between the upstanding supports through which the technician may bodily pass.

In a preferred embodiment an entry and an exit space or passage gap is defined at opposed sides of the support zone permitting the technician to bodily walk through the support zone from one side to the other.

In one or more embodiments, a plurality of upstanding supports may be mounted to a base means.

The structure is preferably freestanding and transportable. The structure may beneficially be collapsible.

In one or more embodiments, the support structure may comprise a plurality of connected frame elements, including upstanding posts to support the glazing panel in the laid down attitude at the support zone.

It is preferred hat the support elements (which may be in the form of support pads) are provided at the upper end of upstanding supports to support the glazing panel in the laid own attitude at the support zone.

Beneficially, the locating formation of the support element comprises a groove or channel provided on an upper part of the respective support element. The groove or channel preferably extends entirely across the support element intersecting with opposed edges of the support element.

In a preferred embodiment, the groove or channel comprises a concave, (preferably an arc-form) channel or groove. Beneficially, a respective support element comprises a generally planar surface with the groove or channel being recessed with respect to the generally planar surface.

In a preferred realisation of the invention, the system further comprises a handling tool provided with mounting means for mounting the handling tool to be secured on to a face of the glazing panel, the handling tool including means for engagement with the locating formation of the support structure for locating the glazing panel with respect to the support structure such that the glazing panel can be tilted or pivotally moved with respect to the support structure.

The locating formation of the support element of the support structure preferably comprises a groove or channel provided on an upper part of the respective support element, and the handling tool beneficially includes a bearing portion to be received in the groove or channel, enabling the glazing panel to be tilted or pivotally moved with respect to the support structure.

The support structure preferably comprises a concave (preferably an arc-form) groove or channel provided on an upper part of the respective support element, and the handling tool preferably includes an elongate bar or rod arranged to be rotatingly received in the channel.

It is preferred that the bar or rod and the arc-form groove or channel have bearing surfaces which have matched radius circumferential surfaces.

BRIEF DESCRIPTION OF THE DRAWINGS

The invention will now be further described, by way of example only with reference to the accompanying drawings.

FIG. 1 is a schematic perspective view of a glazing panel handling system according to the invention;

FIG. 2 is a schematic perspective view of a part of the glazing panel handling system of FIG. 1;

FIG. 3 is a schematic perspective view of an alternative embodiment of glazing panel handling system according to the invention;

FIG. 4 is a plan view of a glazing panel handling system tool that can form a part of the system of the invention;

DETAILED DESCRIPTION OF THE PREFERRED EMBODIMENTS

Figure 11:
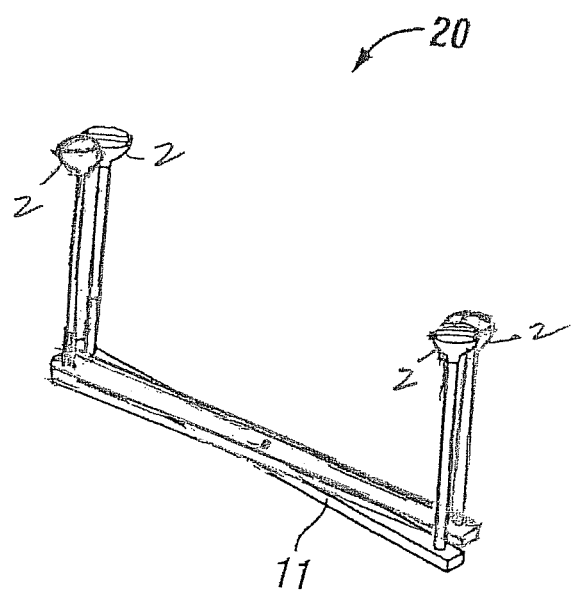
FIG. 11 shows an exemplary collapsed configuration of the glazing panel system of FIG. 1.

Referring to the drawings, and initially to FIG. 1 in particular, an exemplary glazing panel handling system 20 according to the invention consists of a panel support frame structure 21 comprising four spaced upright poles 1 mounted to a scissors linkage base 11 which enables the support frame 21 to be collapsed from the expanded configuration shown in FIG. 1 to a collapsed configuration shown in FIG. 11 for storage and transportation. The upright support poles may be height adjustable by being telescopic, for example.

At the top of each support post 1 is mounted a plastics or rubber support a pad 2. The upper surface of the support pads 2 is generally planar. Some or all of the pads are provided with a radial surface channel 3 in the top surface. The channel 3 extends completely across the extent of the pad 2. Typically the support pads 2 will be mounted on the support poles 1 in such a way as to allow some movement in order to accommodate curved glass. This may readily be achieved by means of pivotally mounting the pads 2 to the poles.

The frame design may vary but essentially is arranged to be open at opposed sides (i.e. the front and rear) to allow a person to pass through the frame structure 21 completely from one side to the other. An alternative configuration is shown in FIG. 3 in which access is provided completely through the support structure from the front side to the rear by having an open front side 51 and an open rear side 52. The support posts 1 may be cross braced 4 at the sides but the support pads 2 are positioned to have sufficient height clearance from any frame member to allow glass to be placed face downwards without any attached ancillary equipment (suction lifters, lifting and positioning aids etc) being obstructed by the support frame structure.

One or more of the support posts 1 may be adjustable to enable the position of the support pad 2 to be re-orientated. For example, an articulated joint or swivel arrangement 5 may be provided proximate an upper end of the respective support post 1, to allow the pad 2 to be repositioned in order to allow any attached equipment sufficient clearance.

A handling tool 19 is used to enable efficient handling of glazing panels in combination with the panel support structure 20. The handling tool 19 comprises a pivot bar 6 consisting of a rod 7 having mounted suction cups 8 in such a way to allow some movement of the suction cups in order to accommodate curved glass. A tilting or pivoting mounting 13 for the suction cups 8 to the bar may be provided for this purpose. The position of the cups 8 on the bar 7 (and their relative spacing) may beneficially be adjustable. The rod 7 is either circular in cross section or has circular section bearing surface portions arranged, and shaped an dimensioned, to fit into the arc surface groove 3 of the support pads 2 such that the rod 7 can rest and rotate in the groove 3. In a preferred embodiment, the bearing surfaces of the rod and the groove are effectively matched radius circumferential surfaces. It will be appreciated that other surface profiles (such as octagonal, hexagonal, or even square) for the rod 7 will achieve a similar effect, but a circular surface profile is preferred. During use the handling tool 19 is mounted, using the suction cups 8 to a windscreen 9 in such a way that the rod 7 locates into the channel 3 in the top of the pad 2.

Figure 5:
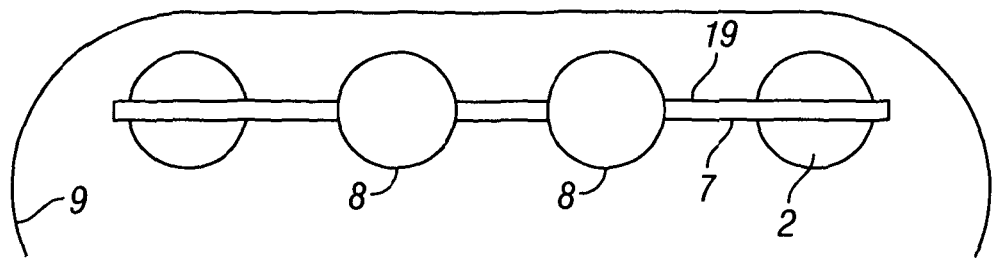
FIG. 5 is a schematic plan view of the glazing panel handling system of the invention, in use.
Figure 6:
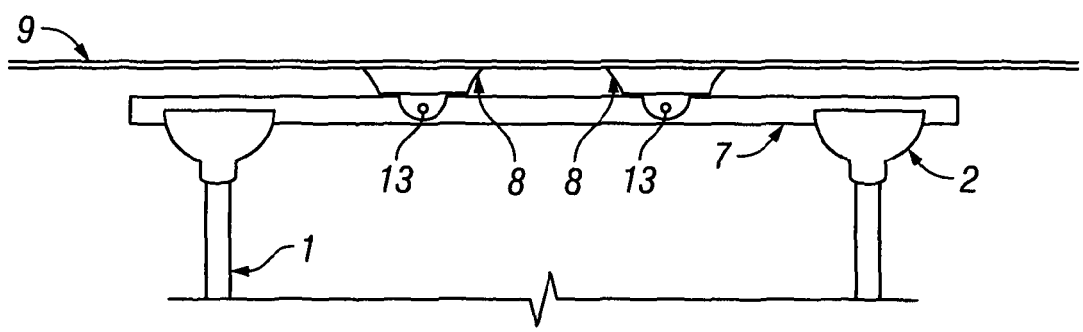
FIG. 6 is a side view corresponding to the view of FIG. 5.
Figure 7:
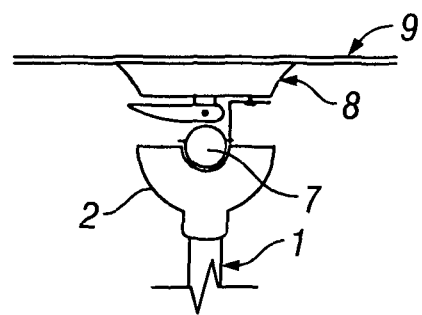
FIG. 7 is an end view corresponding to the views of FIG. 5 and FIG. 6.
Figure 8A:
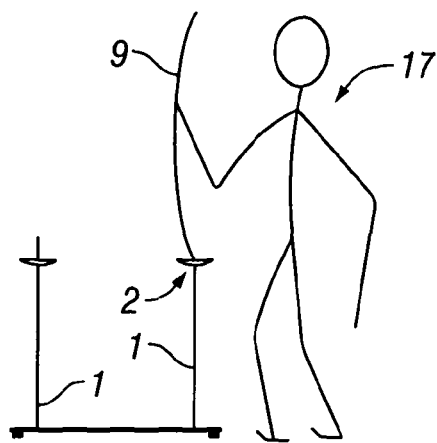
FIGS. 8A to 8F show a sequence of glazing panel handling using the glazing panel handling system of the invention.

In use, the technician 17 stands the windshield 9 on its lower edge located safely into the channels 3 in the upper surface of two of the pads 2. The windshield 9 can then be viewed for the purpose of noticing any defects or scratches prior to fitment. This is the situation shown in FIG. 8A.

Figure 8B:
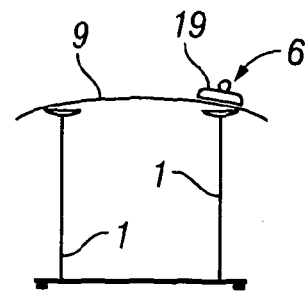

The windshield 9 is next laid down to rest supported on the four support pads 2 with the outer face up. This allows for ancillary equipment (suction lifters, lifting and positioning aids etc) to be attached to the outer surface of the glass. The handling tool 19 may also be attached to the outer surface of the windshield 9. This is the situation shown in FIG. 8B.

Figure 8C:
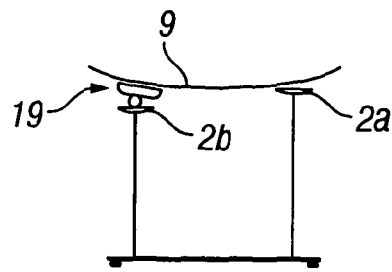

The windshield may next be turned over, and the Pivot bar 6 of the handling tool 19 is located into the arc-form channels 3 in the upper surfaces of the support pads 2, as shown in FIG. 8C. As the windshield is laid down by rotating the pivot bar 6 in the arc-form channels 3, if the ancillary equipment comes into contact with the pads 2 the swivel arrangement 5 may be moved to allow sufficient clearance. If required the height adjustment of the upright support posts 1 may be adjusted to allow the windshield to lay flat. This can be seen from FIG. 8c in which the pad 2a is at a position higher than pad 2b. In this orientation various operations may be conducted on the windshield 9. For example, cleaning, priming and application of adhesive to the inside face of the glass may now be carried out.

Figure 8D:
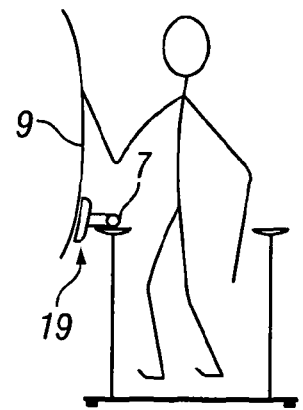

From this position, the windshield can be easily moved to the upright position by lifting the top edge part while the bottom edge part rotates around, and is supported by, the pivot bar 6 resting in the channels 3. this situation is shown in FIG. 8D, where it can be seen that the technician 17 can walk via the open end of the structure across the perimeter of the structure and into the space between the support posts 1 at the perimeter of the structure.

Figure 8E:
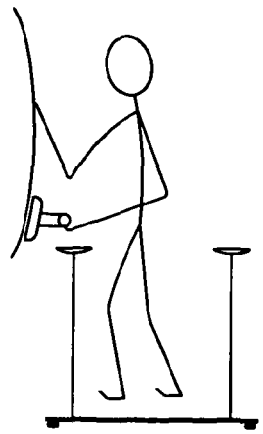
Figure 8F:
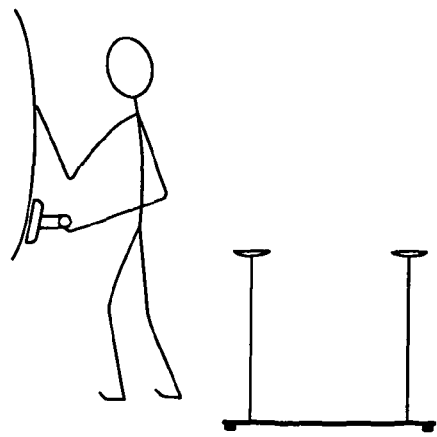

The glass is now fully supported and the technician can adjust his grip, holding either pivot bar 6 of the handling tool 9 and/or additional suction lifters and/or ancillary positioning equipment. This situation is shown in FIG. 8E. The windshield can next be lifted from the support frame structure in a safe manner with a straight back. If required the height adjustment of the upright poles 1 can be adjusted to suit the stature of the individual technician in order that lifting is done in the safest manner.

As shown in FIG. 8E, the technician can continue walking through the perimeter of the support structure via the opposite open end of the frame, holding the windshield 9 in a safe manner with a straight back, and take the windshield to the vehicle to finish the installation.

Figure 9:
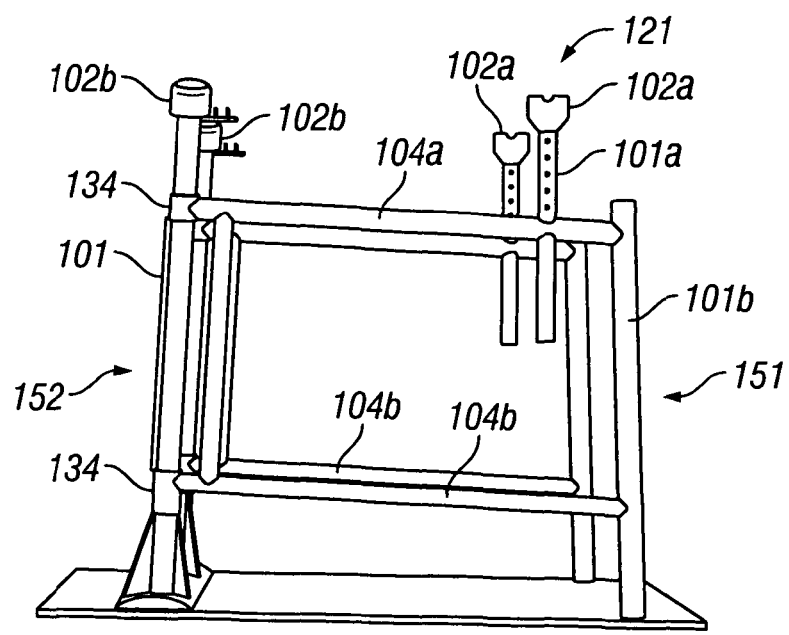
FIG. 9 is a perspective side view of a further embodiment of glazing panel handling system in accordance with the invention.
Figure 10:
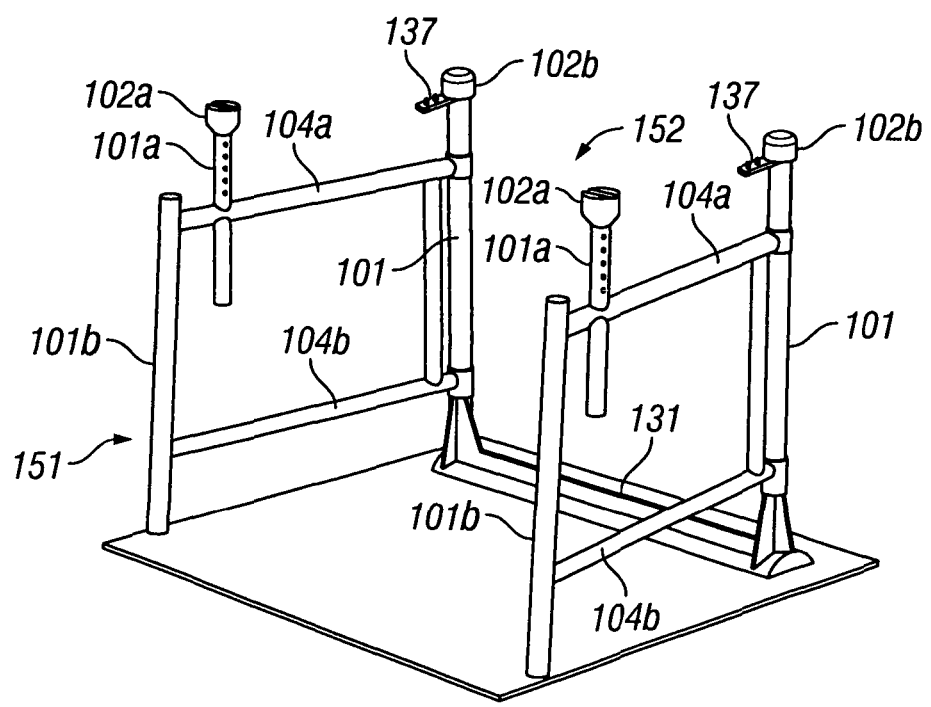
FIG. 10 is an alternative perspective view of the embodiment of FIG. 9.

An alternative configuration is shown in FIGS. 9 and 10 in which access is provided completely through the support structure from the front side to the rear by having an open front side 151 and an open rear side 152. The arrangement is generally similar to the embodiment of FIG. 3. The support posts 101 may be cross braced by upper and lower cross braces 104*a*, 104*b* at the sides and a rear ground bar 131 is provided connecting across the rear posts 101*b*. The cross braces are hinge mounted to the rear support posts 101 at hinge mountings 134, enabling the structure to be collapsed for transportation and storage.

The forward support posts are effectively divided in two having upper support posts 101*a* offset spaced transversely to the axial direction, from lower support posts 101*b*. This enables the support pads for engaging the glazing panel to be optimum spaced, whilst the ground engaging support posts are optimum spaced for stability. For this reason also, the ground engaging support posts 101*b* and 101 are inclined slightly toward one another from a more widely spaced base to a narrower upper portion.

As with the earlier described embodiments, the embodiment of FIGS. 9 and 10 is arranged to be open at opposed sides (i.e. the front and rear) to allow a person to pass through the frame structure 121 completely from one side to the other.

The support pads of the earlier embodiments are provided at the corners but in this embodiment the two forward pads 102*a* are plastics or rubber and provided with a channel 3 for receiving the edge of the glazing panel, whereas the two rear pads 102*b* are customised friction mounts, which may be made low friction by having a central low friction material central proud standing button 102*c* or rotatable ball. Alternatively the custom friction mounts may be made high friction mounts for example by having a central rubber or other high friction material central proud standing button 102*c*. In certain embodiments high and low friction custom mounts may be provided alternatively on each of the custom mounts 102*b*.

Just below the rear mounts 102*b* are provided docking brackets 137 for receiving the opposed ends of the handling tool 19.

The invention claimed is:

1. A handling system for use by a technician in conjunction with a glazing panel, the handling system comprising:
    a support structure having an expanded configuration arranged to support the glazing panel in a laid down attitude at a support zone disposed above the support structure;
    wherein the support structure includes two pairs of upstanding supports operably coupled to a ground-engaging base, wherein the upstanding supports of each pair include a rear upstanding support that is coupled to a front upstanding support by at least one cross brace;
    wherein, in the expanded configuration, the pairs of upstanding supports and corresponding cross braces are operably disposed on opposite sides of space disposed below the support zone in order to define access means that permits the technician to move bodily into and out of the space disposed below the support zone from one open side of said space to an opposite open side of said space, wherein said access means comprises an open, unobstructed passageway which enables the technician to bodily pass completely through the support structure, wherein the open passageway is disposed between said two pairs of upstanding supports and corresponding cross braces and extends laterally between the one open side of said space to the opposite open side of said space;
    wherein the rear upstanding support of each given pair extends upward from the ground-engaging base in an axial direction and the front upstanding support and cross brace of the given pair pivot together about the axial direction of the corresponding rear upstanding support of the given pair in order to collapse the support structure; and
    wherein the opposed pairs of upstanding supports and corresponding cross braces are coupled to one another solely by the ground-engaging base in the expanded configuration, and wherein in the expanded configuration the front upstanding support and cross brace of each given pair are free to pivot about to the axial direction of the corresponding rear upstanding support of the given pair.

2. A handling system according to claim 1, wherein:
    the support structure further includes at least one support element having a locating formation for locating the glazing panel with respect to the support structure such that the glazing panel can be pivotally moved with respect to the support structure.

3. A handling system according to claim 1, wherein:
    the two pairs of upstanding supports are configured to support the glazing panel in the laid down attitude at the support zone.

4. A handling system according to claim 3, wherein:
    the spacing between said pairs of upstanding supports is adjustable.

5. A handling system according to claim 3, wherein:
    in said expanded configuration, said two pairs of upstanding supports are provided at a perimeter of said space disposed below the support zone and said access means permits the technician to move bodily into and out of said space below the support zone.

6. A handling system according to claim 1, wherein:
    the support structure is freestanding and transportable.

7. A handling system according to claim 2, wherein:
    said at least one support element is provided at an upper end of a respective upstanding support to support the glazing panel in the laid down attitude at the support zone.

8. A handling system according to claim 7, wherein:
    the locating formation of the support element comprises a groove or channel provided on an upper part of the respective support element.

9. A handling system according to claim 8, wherein:
    the groove or channel extends across the support element intersecting with opposed edges of the support element.

10. A handling system according to claim 8, wherein:
    the groove or channel is concave in form.

11. A handling system according to claim 8, wherein:
    the respective support element comprises a generally planar surface with the groove or channel being recessed with respect to the generally planar surface.

12. A handling system according to claim 2, further comprising:
    a handling tool provided with mounting means for mounting the handling tool to be secured on to a face of the glazing panel, the handling tool including means for engagement with the locating formation of the support structure.

13. A handling system according to claim 12, wherein:
    the locating formation of the support element of the support structure comprises a groove or channel provided on an upper part of a respective support element, and the means for engagement of the handling tool includes a bearing portion to be received in the groove or channel, enabling the glazing panel to be pivotally moved with respect to the support structure.

14. A handling system according to claim 12, wherein:
the locating formation includes a groove or channel of concave form provided on an upper part of the respective support element, and the handling tool includes an elongate member arranged to be rotatably received in the groove or channel.

15. A handling system according to claim 14, wherein:
the elongate member and the groove or channel have bearing surfaces which have matched radius circumferential surfaces.

16. A handling system according to claim 1, wherein:
the access means is configured to permit the technician to walk bodily through said space disposed below the support while holding the glazing panel with a straight back.

17. A handling system according to claim 1, wherein:
the support structure is arranged to support the glazing panel such that the glazing panel rests upon the support structure in a flat laid down attitude.

18. A handling system according to claim 1, wherein:
the open passageway extends vertically completely between the support zone and the ground-engaging base.

19. A support structure expandable into an expanded configuration arranged to support a glazing panel in a laid down attitude at a support zone disposed above the support structure, the support structure comprising:
a ground-engaging base;
a first pair of upstanding supports operably coupled to the ground-engaging base, wherein the upstanding supports of the first pair are coupled to one another by at least one first cross brace; and
a second pair of upstanding supports operably coupled to the ground-engaging base, wherein the upstanding supports of the second pair are coupled to one another by at least one second cross brace;
wherein, in the expanded configuration, the first and second pairs of upstanding supports extend upward from the ground-engaging base and are disposed opposite each other across a space disposed below the support zone, wherein said space permits a technician to move completely through the space;
wherein one upstanding support of the first pair of upstanding supports and the first cross brace are configured to pivot together relative to the other upstanding support of the first pair of upstanding supports;
wherein one upstanding support of the second pair of upstanding supports and the second cross brace are configured to pivot together relative to the other upstanding support of the second pair of upstanding supports; and
wherein, in the expanded configuration, the first pair of upstanding supports and first cross brace are coupled to the second pair of upstanding supports and second cross brace solely by the ground-engaging base.

* * * * *